(12) United States Patent
Ranjan et al.

(10) Patent No.: US 11,295,340 B2
(45) Date of Patent: Apr. 5, 2022

(54) ADVERTISING CANNIBALIZATION MANAGEMENT

(71) Applicant: PayPal, Inc., San Jose, CA (US)

(72) Inventors: Chitta Ranjan, Atlanta, GA (US); Huma Zaidi, South San Francisco, CA (US); Neha Singh, Foster City, CA (US)

(73) Assignee: PayPal, Inc., San Jose, CA (US)

( * ) Notice: Subject to any disclaimer, the term of this patent is extended or adjusted under 35 U.S.C. 154(b) by 150 days.

(21) Appl. No.: 16/735,004

(22) Filed: Jan. 6, 2020

(65) Prior Publication Data

US 2020/0143416 A1 May 7, 2020

Related U.S. Application Data

(63) Continuation of application No. 14/555,268, filed on Nov. 26, 2014, now abandoned.

(60) Provisional application No. 61/913,157, filed on Dec. 6, 2013.

(51) Int. Cl.
*G06Q 30/02* (2012.01)

(52) U.S. Cl.
CPC ..... *G06Q 30/0247* (2013.01); *G06Q 30/0242* (2013.01)

(58) Field of Classification Search
CPC . G06Q 30/02; G06Q 30/0247; G06Q 30/0242
See application file for complete search history.

(56) References Cited

U.S. PATENT DOCUMENTS

| | | | | |
|---|---|---|---|---|
| 8,073,738 B2* | 12/2011 | Protheroe | .......... | G06Q 30/0275 705/14.69 |
| 8,571,930 B1* | 10/2013 | Galperin | ............ | G06Q 30/0242 705/14.43 |
| 8,639,574 B2* | 1/2014 | Agarwal | ............ | G06Q 30/0244 705/14.43 |
| 2004/0225562 A1* | 11/2004 | Turner | ................... | G06Q 30/02 705/14.45 |
| 2008/0255922 A1* | 10/2008 | Feldman | ................ | G06Q 30/02 705/14.71 |
| 2008/0275757 A1* | 11/2008 | Sharma | .................. | G06Q 30/02 705/7.29 |
| 2009/0037375 A1* | 2/2009 | Won Cho | ............... | G06Q 30/02 |
| 2009/0138357 A1* | 5/2009 | Riggs | ................. | G06Q 30/0601 705/14.52 |
| 2011/0225037 A1* | 9/2011 | Tunca | .................... | G06Q 30/08 705/14.46 |

(Continued)

OTHER PUBLICATIONS

Entire Prosecution History of U.S. Appl. No. 14/555,268, titled Advertising Cannibalization Management, filed Nov. 26, 2014.

*Primary Examiner* — Thuy N Nguyen

(57) ABSTRACT

A system and method for advertising cannibalization management are provided. In example embodiments, historical data comprising advertisement revenue, advertisement parameters, and a cannibalization metric are accessed. The cannibalization metric is indicative of sales loss associated with an advertisement presentation. A value for at least one of the advertisement parameters that, when used, causes a desired advertisement revenue with respect to a bounded cannibalization metric is determined by analyzing the historical data. An advertisement is presented, in real time, on a user interface of a client device using the determined value.

19 Claims, 11 Drawing Sheets

(56) References Cited

U.S. PATENT DOCUMENTS

| | | | | |
|---|---|---|---|---|
| 2013/0066725 A1* | 3/2013 | Umeda | ............ | G06Q 30/0275 |
| | | | | 705/14.66 |
| 2013/0080264 A1* | 3/2013 | Umeda | ............... | G06Q 30/02 |
| | | | | 705/14.69 |
| 2014/0100944 A1* | 4/2014 | Zhu | ................ | G06Q 30/0275 |
| | | | | 705/14.41 |
| 2014/0136344 A1* | 5/2014 | Ringdahl | ......... | G06Q 30/0273 |
| | | | | 705/14.71 |
| 2014/0149212 A1* | 5/2014 | Shimura | .......... | G06Q 30/0254 |
| | | | | 705/14.52 |
| 2014/0189509 A1* | 7/2014 | Moran | ............... | G06F 9/453 |
| | | | | 715/708 |
| 2014/0297431 A1* | 10/2014 | Catania | ........... | G06Q 30/0277 |
| | | | | 705/14.73 |
| 2015/0127469 A1* | 5/2015 | Cui | ................ | G06Q 30/0275 |
| | | | | 705/14.71 |
| 2015/0339704 A1* | 11/2015 | Liu | ................ | G06Q 30/0247 |
| | | | | 705/14.46 |

* cited by examiner

ADVERTISING CANNIBALIZATION MANAGEMENT

CROSS-REFERENCE TO RELATED APPLICATIONS

This application is a continuation of U.S. patent application Ser. No. 14/555,268, filed on Nov. 26, 2014; which claims the benefit of U.S. Patent Application Ser. No. 61/913,157, filed on Dec. 6, 2013; the disclosures of which are incorporated herein by reference in their entireties.

TECHNICAL FIELD

Embodiments of the present disclosure relate generally to computer technology and, more particularly, but not by way of limitation, to advertising cannibalization management.

BACKGROUND

Digital advertising has become a significant source of revenue for many online companies. However, excessive advertising can cause a loss in sales revenue for websites that sell products to consumers. For instance, a sales cannibalization occurs when an advertisement directs a consumer away from a website selling products and potential sales to the consumer at the website are lost.

BRIEF DESCRIPTION OF THE DRAWINGS

Various ones of the appended drawings merely illustrate example embodiments of the present disclosure and should not be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A website that sells products to consumers can also generate revenue though third party advertisements (also referred to as "ads"). In some cases, sales revenue is more beneficial than advertising revenue as there is a high value per transaction, and each sale can increase customer loyalty, which may lead to future sales revenue through repeated business. However, frequency of sales transactions can be relatively small or sporadic. Advertisement revenue is a secondary source of revenue to monetize non-converting user sessions (e.g., a session where a customer did not make a purchase). In some instances, advertising causes sales cannibalizations. A sales cannibalization occurs, for example, when a user is visiting the website, sees an advertisement, clicks on the advertisement, and is directed away from the website. In this example, a potential sale to the user is lost when the user is directed away from the website. Removing all advertisements from the website can stop sales cannibalization caused by advertisements, but may not maximize total revenue.

In various example embodiments, a cannibalization regulation system is employed to manage sales cannibalization while improving or enhancing advertisement revenue. The cannibalization regulation system accesses historical data including advertisement revenue, advertisement parameters (e.g., advertisement placement, impressions, clicks), and a cannibalization metric. The cannibalization metric is indicative of sales loss associated with an advertisement presentation. The cannibalization regulation system determines a value for one or more advertisement parameters that causes a desired advertisement revenue or maximizes/optimizes the advertisement revenue with respect to a bounded cannibalization metric by analyzing the historical data. Subsequently, the cannibalization regulation system causes presentation of an advertisement on a user interface of a client device using the determined value. In this way, the advertisement revenue can be specified, improved, enhanced, or optimized while maintaining a certain level of sales cannibalization.

Figure 1:
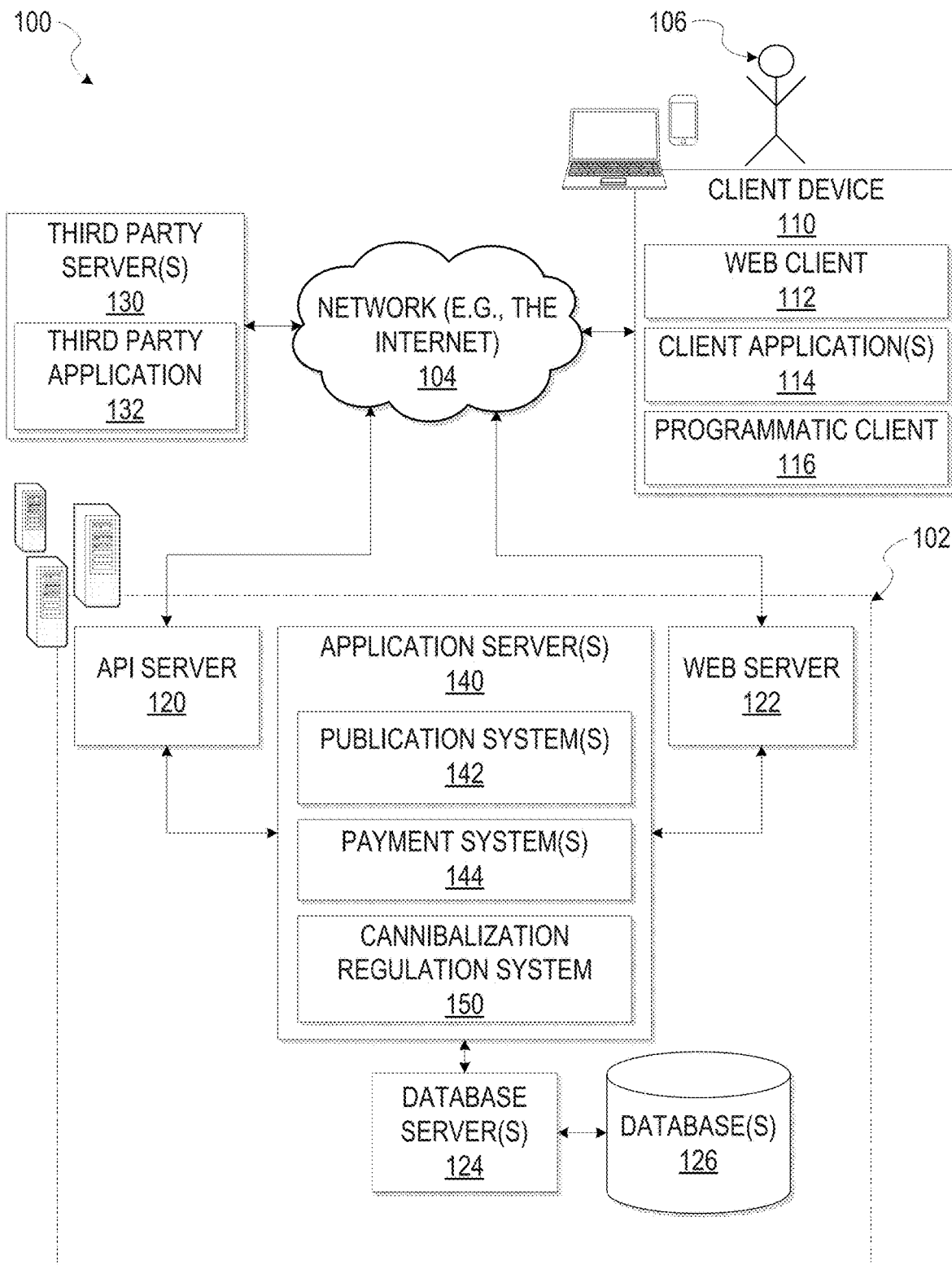
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the INTERNET EXPLORER® browser developed by MICROSOFT® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 can host one or more publication system(s) 142, payment system(s) 144, and a cannibalization regulation system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the cannibalization regulation system 150 provides functionality to improve advertisement revenue while maintaining a specified or dynamically determined level of cannibalization. In some example embodiments, the cannibalization regulation system 150 communicates with the client device 110, the third party server(s) 130, the publication system(s) 142 (e.g., retrieving listings), and the payment system(s) 144 (e.g., purchasing a listing). In an alternative example embodiment, the cannibalization regulation system 150 is a part of the publication system(s)

142. The cannibalization regulation system 150 will be discussed further in connection with FIG. 3 below.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as stand-alone software programs, which do not necessarily have networking capabilities.

Figure 2:
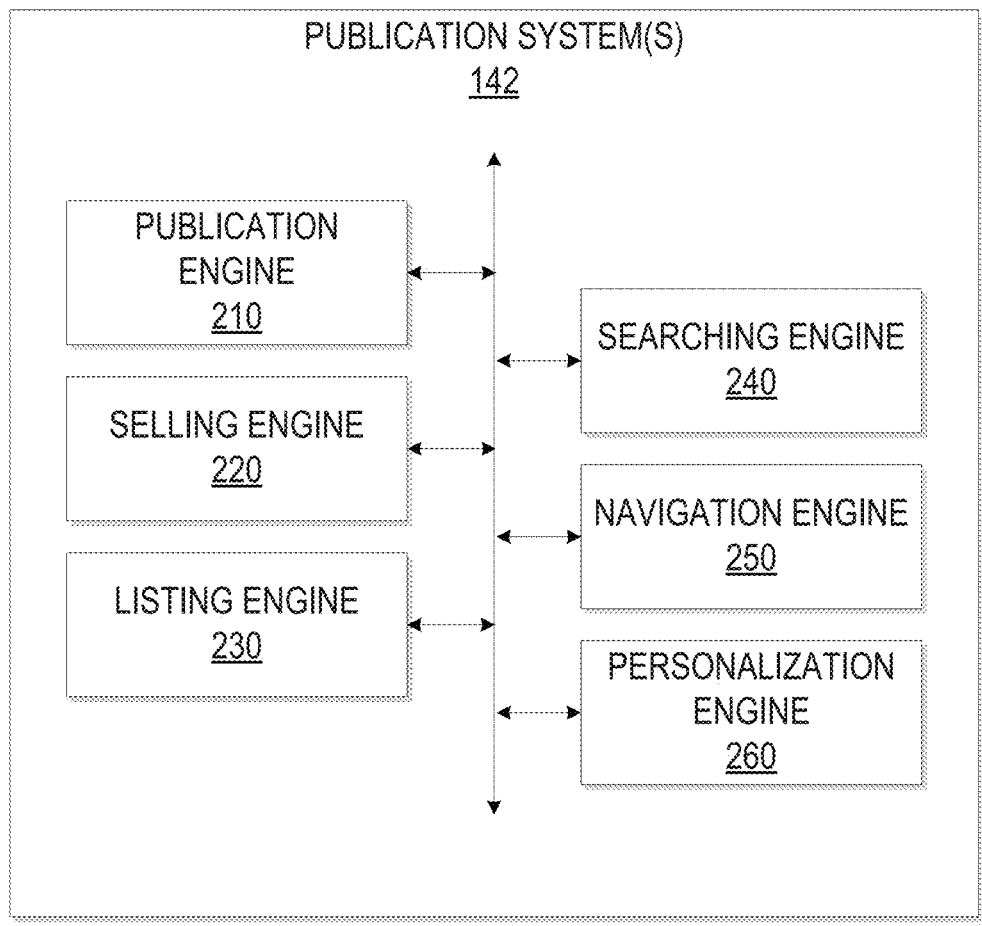
FIG. 2 is a block diagram showing example components provided within the system of FIG. 1, according to some example embodiments.

FIG. 2 illustrates a block diagram showing components provided within the publication system(s) 142, according to some embodiments. In various example embodiments, the publication system(s) 142 comprises a market place system to provide market place functionality (e.g., facilitating the purchase of items associated with item listings on an e-commerce website). The publication system(s) 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124.

The publication system(s) 142 provides a number of publishing, listing, and price-setting mechanisms whereby a seller (also referred to as a "first user") may list (or publish information concerning) goods or services for sale or barter, a buyer (also referred to as a "second user") can express interest in or indicate a desire to purchase or barter such goods or services, and a transaction (such as a trade) may be completed pertaining to the goods or services. To this end, the publication system(s) 142 comprises a publication engine 210 and a selling engine 220, according to some embodiments. The publication engine 210 publishes information, such as item listings or product description pages, on the publication system(s) 142. In some embodiments, the selling engine 220 comprises one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller specifies a reserve price in connection with a listing and a proxy-bidding feature whereby a bidder may invoke automated proxy bidding. The selling engine 220 can further comprise one or more deal engines that support merchant-generated offers for products and services.

A listing engine 230 allows sellers to conveniently author listings of items or authors to author publications. In one embodiment, the listings pertain to goods or services that a user (e.g., a seller) wishes to transact via the networked system 102. In some embodiments, the listings can be an offer, deal, coupon, or discount for the good or service. Each good or service is associated with a particular category. The listing engine 230 receives listing data such as title, description, and aspect name/value pairs. Furthermore, each listing for a good or service can be assigned an item identifier. In other embodiments, a user may create a listing that is an advertisement or other form of information publication. The listing information may then be stored to one or more storage devices coupled to the networked system 102 (e.g., database(s) 126). Listings also can comprise product description pages that display a product and information (e.g., product title, specifications, and reviews) associated with the product. In some embodiments, the product description page includes an aggregation of item listings that correspond to the product described on the product description page.

The listing engine 230 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 230 receives as much or as little listing data, such as title, description, and aspect name/value pairs, that the buyer is aware of about the requested item. In some embodiments, the listing engine 230 parses the buyer's submitted item information and completes incomplete portions of the listing. For example, if the buyer provides a brief description of a requested item, the listing engine 230 parses the description, extracts key terms, and uses those terms to make a determination of the identity of the item. Using the determined item identity, the listing engine 230 retrieves additional item details for inclusion in the buyer item request. In some embodiments, the listing engine 230 assigns an item identifier to each listing for a good or service.

In some embodiments, the listing engine 230 allows sellers to generate offers for discounts on products or services. The listing engine 230 can receive listing data, such as the product or service being offered, a price or discount for the product or service, a time period for which the offer is valid, and so forth. In some embodiments, the listing engine 230 permits sellers to generate offers from sellers' mobile devices. The generated offers can be uploaded to the networked system 102 for storage and tracking.

Searching the publication system(s) 142 is facilitated by a searching engine 240. For example, the searching engine 240 enables keyword queries of listings published via the publication system(s) 142. In example embodiments, the searching engine 240 receives the keyword queries from a device (e.g., client device 110) of a user (e.g., user 106) and conducts a review of the storage device storing the listing information. The review will enable compilation of a result set of listings that can be sorted and returned to the client device 110 of the user. The searching engine 240 can record the query (e.g., keywords) and any subsequent user actions and behaviors (e.g., navigations, selections, or click-throughs).

The searching engine 240 also can perform a search based on a location of the user. A user may access the searching engine 240 via a mobile device and generate a search query. Using the search query and the user's location, the searching engine 240 returns relevant search results for products, services, offers, auctions, and so forth to the user. The searching engine 240 can identify relevant search results both in list form and graphically on a map. Selection of a graphical indicator on the map can provide additional details regarding the selected search result. In some embodiments, the user specifies, as part of the search query, a radius or distance from the user's current location to limit search results.

In a further example, a navigation engine 250 allows users to navigate through various categories, catalogs, or inventory data structures according to which listings may be classified within the publication system(s) 142. For example, the navigation engine 250 allows a user to successively navigate down a category tree comprising a hierarchy of categories (e.g., the category tree structure) until a particular set of listings is reached. Various other navigation applications within the navigation engine 250 can be provided to supplement the searching and browsing applications. The navigation engine 250 can record the various user actions (e.g., clicks) performed by the user in order to navigate down the category tree.

In some embodiments, a personalization engine 260 provides functionality to personalize various aspects of user interactions with the networked system 102. For instance, the user can define, provide, or otherwise communicate personalization settings used by the personalization engine 260 to determine interactions with the publication system(s) 142. In further example embodiments, the personalization engine 260 determines personalization settings automatically and personalizes interactions based on the automatically determined settings. For example, the personalization engine 260 determines a native language of the user and automatically presents information in the native language.

Figure 3:
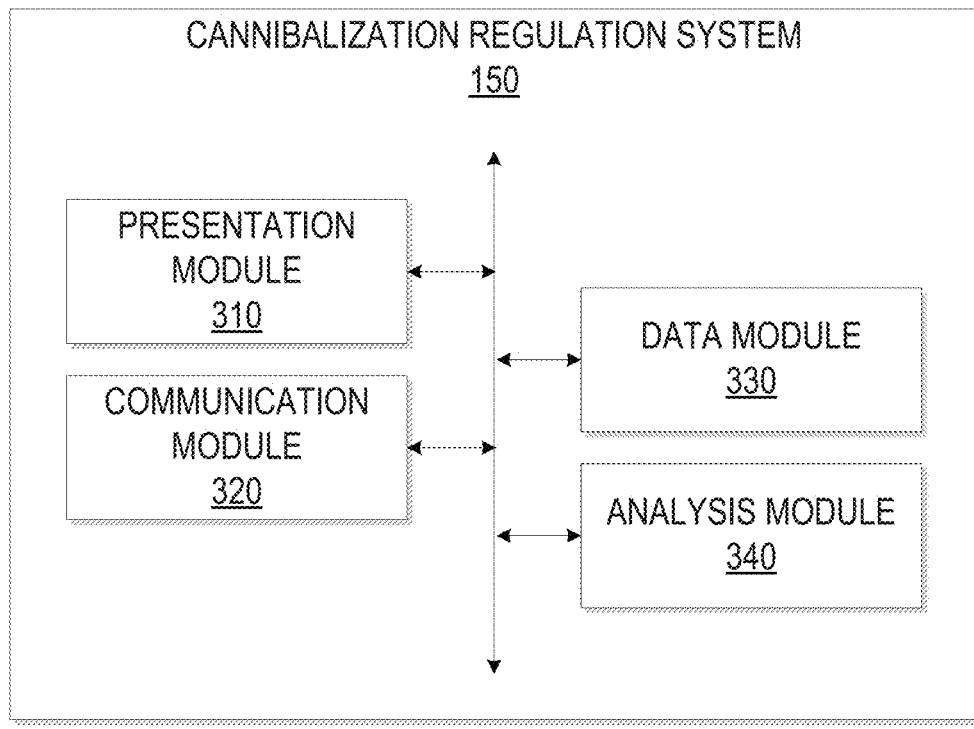
FIG. 3 is a block diagram illustrating an example embodiment of a cannibalization regulation system, according to some example embodiments.

FIG. 3 is a block diagram of the cannibalization regulation system 150 that provides functionality to improve advertisement revenue while maintaining a specified or dynamically determined level of cannibalization. In an example embodiment, the cannibalization regulation system 150 includes a presentation module 310, a communication module 320, data module 330, and an analysis module 340. All, or some, of the modules 310-340 of FIG. 3 communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown.

In some implementations, the presentation module 310 provides various presentation and user interface functionality operable to interactively present (or cause presentation) and receive information from the user. For instance, the presentation module 310 can cause presentation of an advertisement on a user interface of a user device. In various implementations, the presentation module 310 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 310 provides many other user interfaces to facilitate functionality described herein. Further, it will be appreciated that "presenting" as used herein is intended to include communicating information or instructions to a particular device that is operable to perform presentation based on the communicated information or instructions.

The communication module 320 provides various communications functionality and web services. For example, the communication module 320 provides network communication such as communicating with the networked system 102, the client device 110, and the third party server(s) 130. In various example embodiments, the network communication can operate over wired or wireless modalities. Web services are intended to include retrieving information from the third party server(s) 130, the database(s) 126, and the application server(s) 140. In some embodiments, the communication module 320 receives information from the client device 110 such as advertisement parameters or metrics resulting from presented advertisements (e.g., whether the user clicked on a particular advertisement, or a number of advertisement impressions a particular user or client device has viewed).

The data module 330 provides functionality to access historical data and current data, each of which include, for example, advertisement revenue, advertisement parameters, one or more cannibalization metrics, and other data. In some embodiments, the historical data and the current data can be stored in the database(s) 126 and accessed by the data module 330. In various embodiments, the data module 330 stores the advertisement revenue, advertisement parameters, and cannibalization metric in the database(s) 126.

The analysis module 340 provides functionality to analyze the historical data and the current data to determine the value for at least one advertisement parameter that causes a desired advertisement revenue (e.g., a maximum advertisement revenue or otherwise optimized advertisement revenue) while maintaining a certain level of cannibalization. For example, the analysis module 340 generates various models that are employed by the analysis module 340 to determine the value for at least one of the advertisement parameters with respect to a bounded cannibalization metric.

Figure 4:
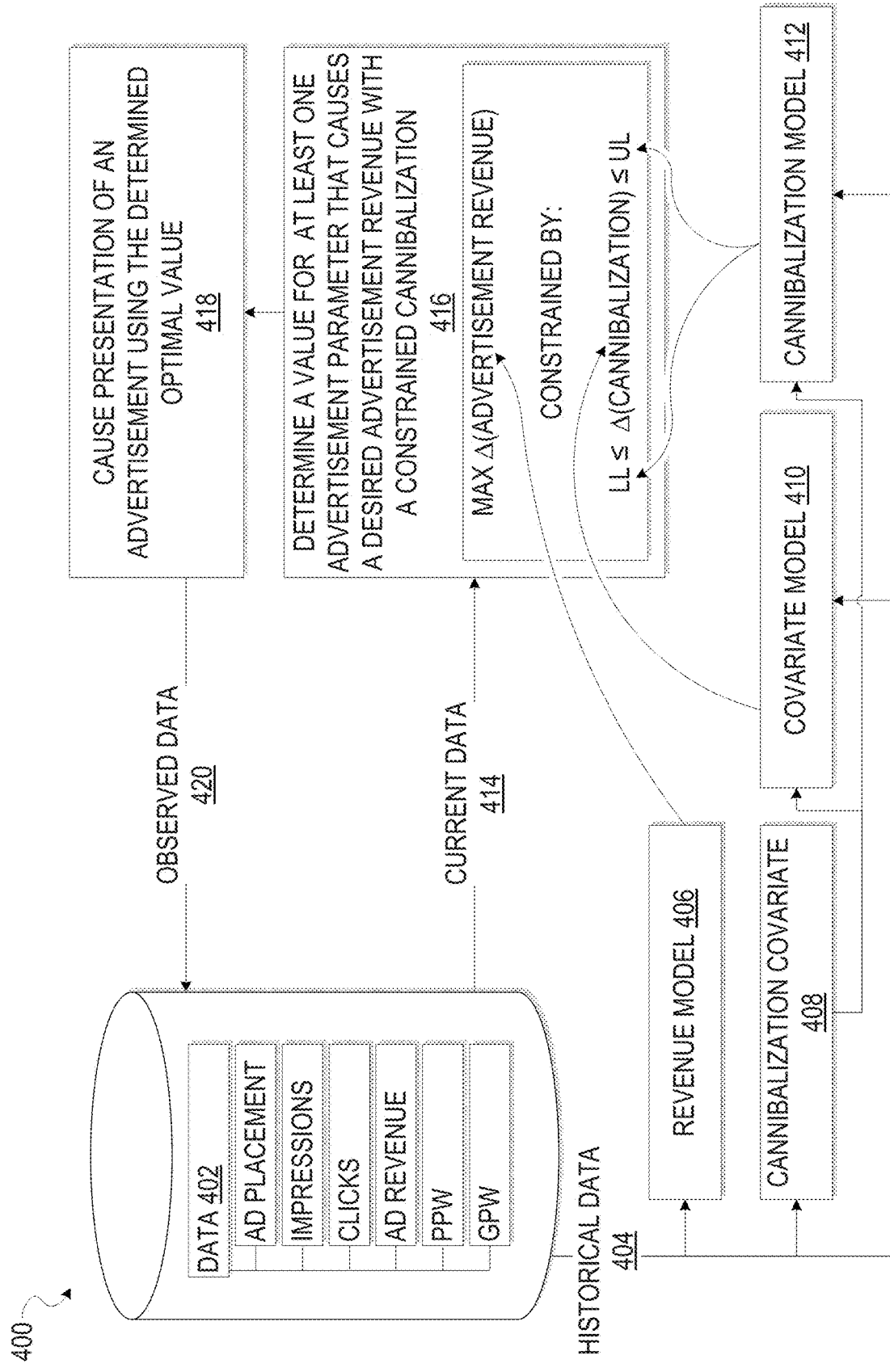
FIG. 4 is a block diagram illustrating an example method for advertising cannibalization management, according to some example embodiments.

FIG. 4 is a block diagram illustrating an example method 400 for advertising cannibalization management. Data 402 includes historical data 404 and current data 414. In various embodiments, the historical data 404 and the current data 414 each include advertisement revenue, advertisement parameters, and one or more cannibalization metrics. In some embodiments, the data 402 is stored in the database(s) 126 accessible by the data module 330. The advertisement parameters include, for example, advertisement placement, impressions, clicks, page views, and other parameters. The advertisement revenue is revenue generated as a result of advertisements (e.g., interactive advertisements on a website being displayed or presented in a browser or in a mobile application on a mobile computing device). The one or more cannibalization metrics can comprise purchase per user per week or the bought items (herein, referred to as PPW) or gross merchandise per user per week or the dollar amount of the bought items (herein, referred to as GPW).

In various embodiments, the analysis module 340 generates a revenue model 406 that models the advertisement revenue with respect to the advertisement parameters. In some embodiments, the revenue model 406 is a polynomial model or another type of model that forms a mathematical relationship between advertisement revenue and the advertisement parameters (e.g., advertisement revenue can be calculated, estimated, or approximated given advertisement parameters and the advertisement revenue model 406). For example, the advertisement revenue can be influenced by the impressions or placement (e.g., a higher number of advertisement impressions can result in a higher advertisement revenue).

The analysis module 340 identifies a cannibalization covariate 408 among candidate covariates (e.g., the advertisement parameters). For instance, an operator, manager, or administrator of the cannibalization regulation system 150 specified the cannibalization covariate among the candidate covariates or the cannibalization regulation system 150 automatically determines the cannibalization covariate 408 among the candidate covariates. The cannibalization covariate is predictive of or correlated with the sales cannibalization (e.g., as the sales cannibalization increases, the cannibalization covariate 408 increases or otherwise changes).

For example, the impressions may be correlated with the sales cannibalization since a higher number of advertisement impressions can increase the probability for a sales cannibalization. That is to say, as more advertisements are shown to a particular user, it is more likely that the particular user may click on an advertisement and a potential sale to the particular user may be lost. Thus, the impressions advertisement parameter can be correlated or predictive of sales cannibalization.

Once the analysis module 340 identifies the cannibalization covariate 408, the analysis module 340 generates a covariate model 410. For instance, the covariate model is a polynomial model or another type of model that forms a mathematical relationship between the cannibalization covariate and the advertisement parameters (e.g., the cannibalization covariate can be calculated, estimated, or approximated given the advertisement parameters and the covariate model 410). The covariate model 410 models the cannibalization covariate with respect to the advertisement parameters. For instance, the covariate model 410 indicates a behavior of the cannibalization covariate 408 with respect to changes in the advertisement parameters. For instance, the covariate model 410 indicates a relationship between the placement of a particular advertisement and the cannibalization covariate 408 (e.g., a particular advertisement placement may increase or decrease the cannibalization covariate 408).

The analysis module 340 generates a cannibalization model 412 that models the cannibalization metric with respect to the cannibalization covariate 408. Similar to the revenue model discussed above, in some embodiments, the cannibalization model 412 is a polynomial model or another type of model that forms a mathematical relationship between cannibalization metric and the cannibalization covariate (e.g., a particular cannibalization metric can be calculated, estimated, or approximated given the cannibalization covariate and the cannibalization model 412 and vice versa). For example, the cannibalization model 412 indicates a relationship between the cannibalization covariate 408 and the cannibalization metric. The cannibalization model 412 allows for comparisons between the cannibalization covariate 408 and the cannibalization metric.

After the analysis module 340 identifies the cannibalization covariate 408, generates the revenue model 406, generates the covariate model 410, and generates the cannibalization model 412, at block 416, the analysis module 340 determines a value for at least one advertisement parameter that causes a desired advertisement revenue (e.g., a highest advertisement revenue) with a bounded or otherwise constrained cannibalization metric.

In various embodiments, the analysis module 340 uses the cannibalization model 412 to determine a lower limit and an upper limit for the bounded cannibalization metric. In these embodiments, an operator, manager, or administrator of the cannibalization regulation system 150 can specify the upper limit and lower limit in terms of the cannibalization metric. The analysis module 340 can convert the upper limit and the lower limit specified in terms of the cannibalization metric to the upper limit and the lower limit in terms of the cannibalization covariate 408 using the cannibalization model 412 (e.g., inputting the cannibalization metric into the cannibalization model 412 to calculate, estimate, or approximate the a value in terms of the cannibalization covariate).

In further example embodiments, the analysis module 340 determines the lower limit for the bounded cannibalization metric according to a minimum advertisement revenue specified by the operator (e.g., determined by the analysis module 340 using the revenue model 406, the covariate model 410, and the cannibalization model 412). In another example embodiment, the analysis module 340 determines the upper limit of the bounded cannibalization metric according to a maximum cannibalization cost specified by the operator (e.g., determined by the analysis module 340 using the revenue model 406, the covariate model 410, and the cannibalization model 412). The cannibalization cost is an amount of lost sales revenue resulting from presentation of advertisements.

Subsequent to bounding the cannibalization metric, the analysis module 340 determines the value for at least one of the advertisement parameters using the revenue model 406 in conjunction with the cannibalization covariate 408 that is constrained by the upper limit and the lower limit specified in terms of the cannibalization covariate 408 (example equations for the analysis module 340 determining the value for at least one of the advertisement parameters are discussed below). In an embodiment, the analysis module 340 determines the value for at least one of the advertisement parameters such that, when used (e.g., presenting advertisements according to the determined value), it causes a desired advertisement revenue (e.g., a maximum advertisement revenue or another advertisement revenue specified by an operator of the cannibalization regulation system 150) of the revenue model 406 while maintaining the cannibalization covariate 408 within the upper limit and lower limit bounds.

Once the analysis module 340 determines the value for at least one of the advertisement parameters, at block 418 the presentation module 310 causes presentation of an advertisement using the determined value. For example, the determined value may be a number of impressions, an advertisement placement, another advertisement parameter, or a suitable combination thereof. After the presentation module 340 causes presentation of the advertising using the determined value, various data (e.g., sales or clicks on advertisements) can be observed or otherwise obtained by the cannibalization regulation system 150. For instance, observed data 420 resulting from a presentation of the advertisement using the determined value is stored by the data module 330 for subsequent analysis. For instance, particular settings for the advertisement parameters may produce certain clicks, sales, and so forth that can be stored for subsequent analysis by the cannibalization regulation system 150.

In some embodiments, the analysis module 340 uses the current data 414 in conjunction with the historical data 404 to determine a change amount for at least one of the advertisement parameters. For example, the current data 414 can include advertisement revenue, advertisement parameters, and one or more cannibalization metrics for a time period of a duration (e.g., one day). The analysis module 340 accesses current advertisement parameters from the current data and determines the change amount corresponding to at least one of the current advertisement parameters. In this example, the change amount, when used, causes a desired advertisement revenue (e.g., a maximum advertisement revenue) while maintaining the bounded cannibalization metric. In this way, the analysis module 340 improves, enhances, or causes the desired advertisement revenue for a rolling period of time as there may not be a global optimization or maximization (e.g., a different optimization or maximization for each new day or each new time period of the duration).

Figure 5:
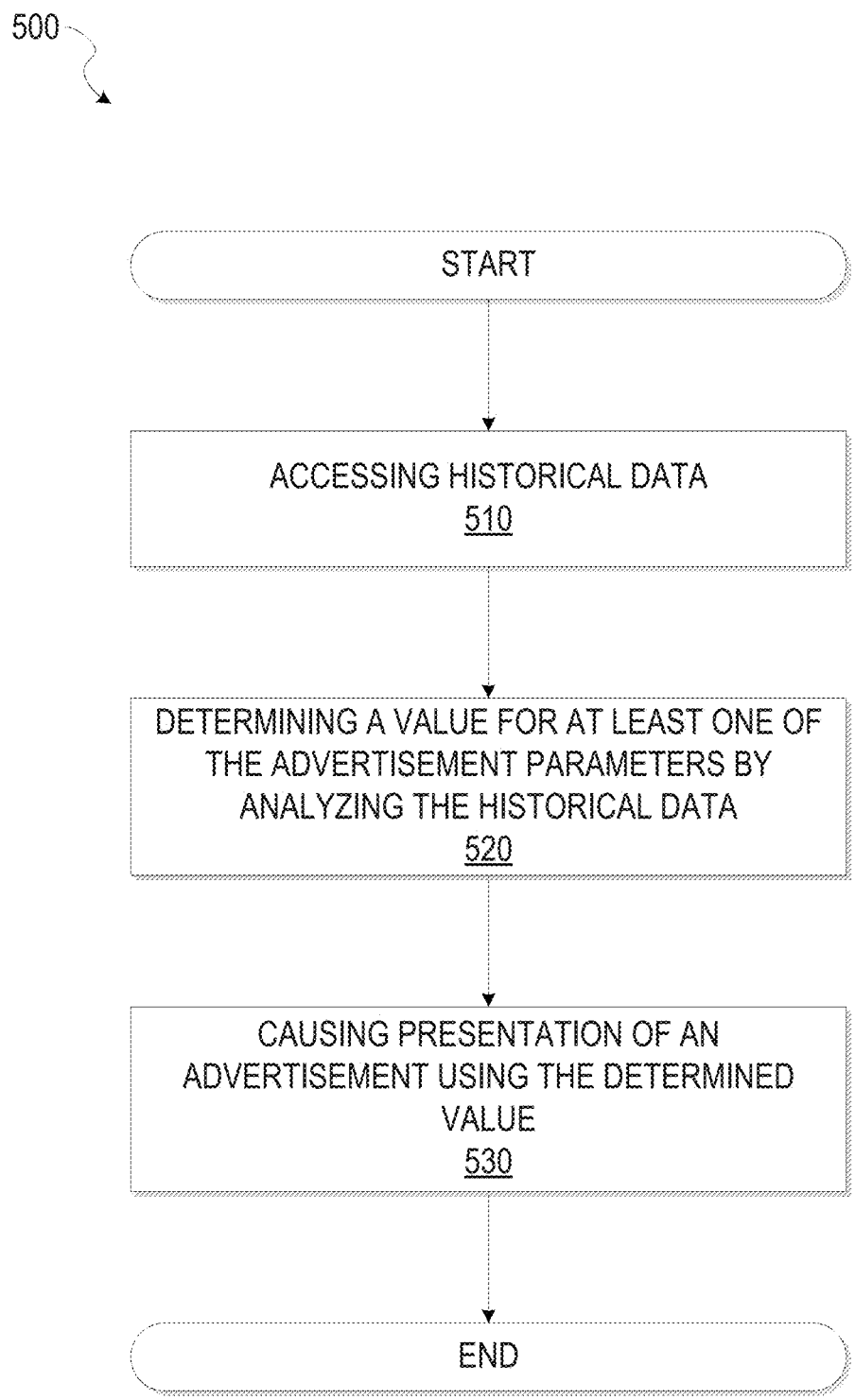
FIG. 5 is a flow diagram illustrating an example method for advertising cannibalization management, according to some example embodiments.

FIG. 5 is a flow diagram illustrating an example method 500 for advertising cannibalization management. The operations of the method 500 can be performed by components of the cannibalization regulation system 150, and are so described below for the purpose of illustration.

At operation 510, the data module 330 accesses historical data and current data. For example, the data module 330 assesses the historical data (e.g., historical data 404) and the current data (e.g., current data 414) from the database(s) 126. The historical data and the current data each include advertisement revenue, advertisement parameters, and one or more cannibalization metrics. The current data pertains to a recent time period of time (e.g., yesterday, or the last hour). For instance, the recent time period can be a time period starting at the present time and extending a certain duration in the past (e.g., one hour, one day, one week).

At operation 520, the analysis module 340 determines the value for at least one of the advertisement parameters by analyzing the historical data. The determined value, when used, causes a desired advertisement revenue (e.g., a maximum advertisement revenue or another specified advertisement revenue) with respect to a bounded cannibalization metric. That is to say, the analysis module 340 determines the value for at least one of the advertisement parameters (e.g., placement or impressions) such that advertisement revenue is maximized, optimized, or specified while maintaining a certain level of cannibalization (e.g., as determined by the cannibalization metric). In some embodiments, the level of cannibalization is specified by an operator, administration, or manager of the cannibalization regulation system 150.

Figure 6:
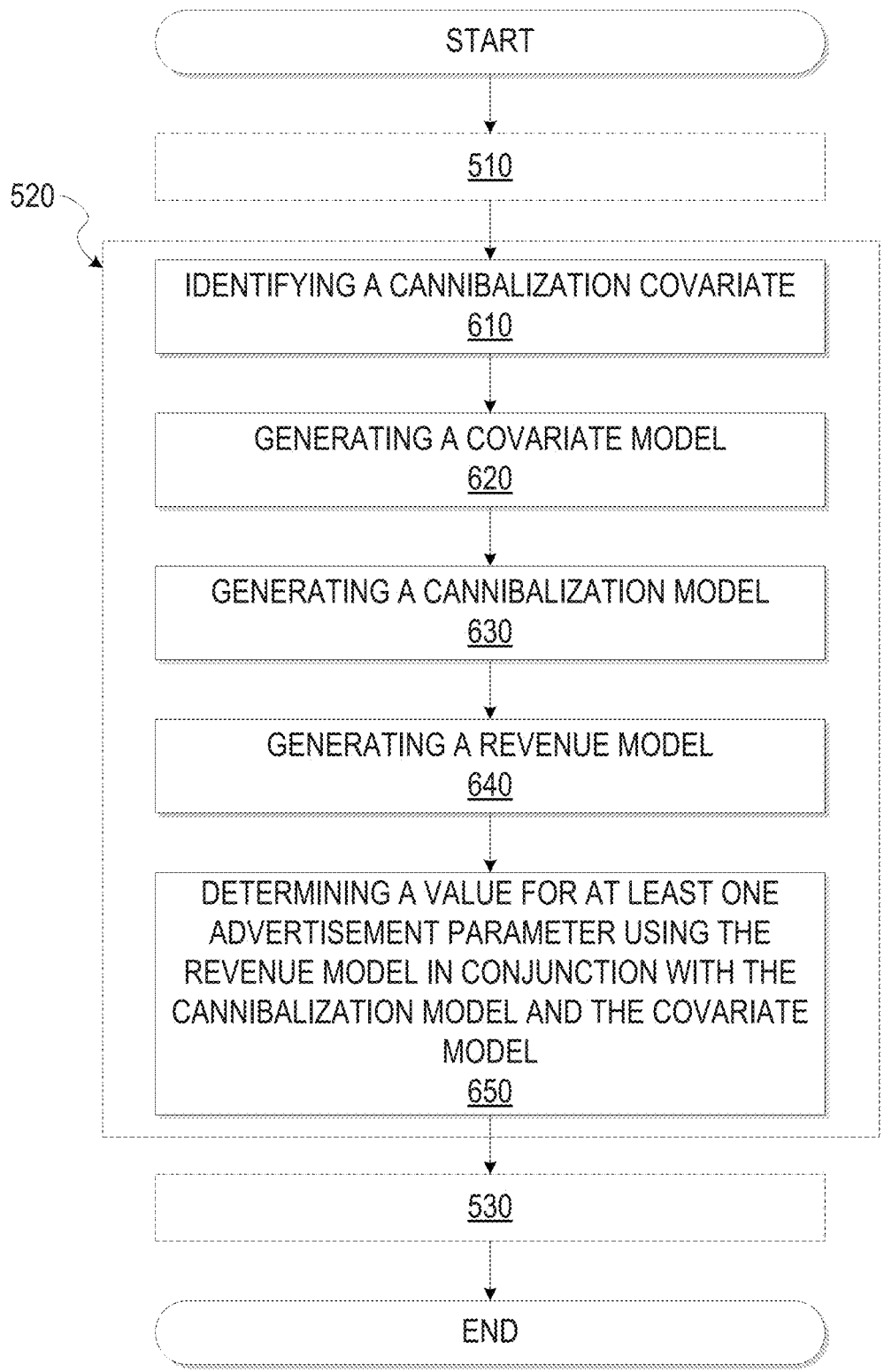
FIG. 6 is a flow diagram illustrating example operations for determining an advertisement parameter, according to some example embodiments.

Referring now to FIG. 6, a flow diagram illustrating example operations for determining an advertisement parameter is shown. Subsequent to the data module 330 accessing the historical data at the operation 510, the analysis module 340 determines a value for at least one of the advertisement parameters by analyzing the historical data at the operation 520. In some embodiments, the operation 520 includes the additional operations of FIG. 6.

At operation 610, the analysis module 340 identifies the cannibalization covariate from among candidate covariates (e.g., advertisement parameters such as clicks, impressions, page views). For instance, the cannibalization covariate is a particular advertisement parameter that is correlated with or predictive of sales cannibalization.

Figure 7:
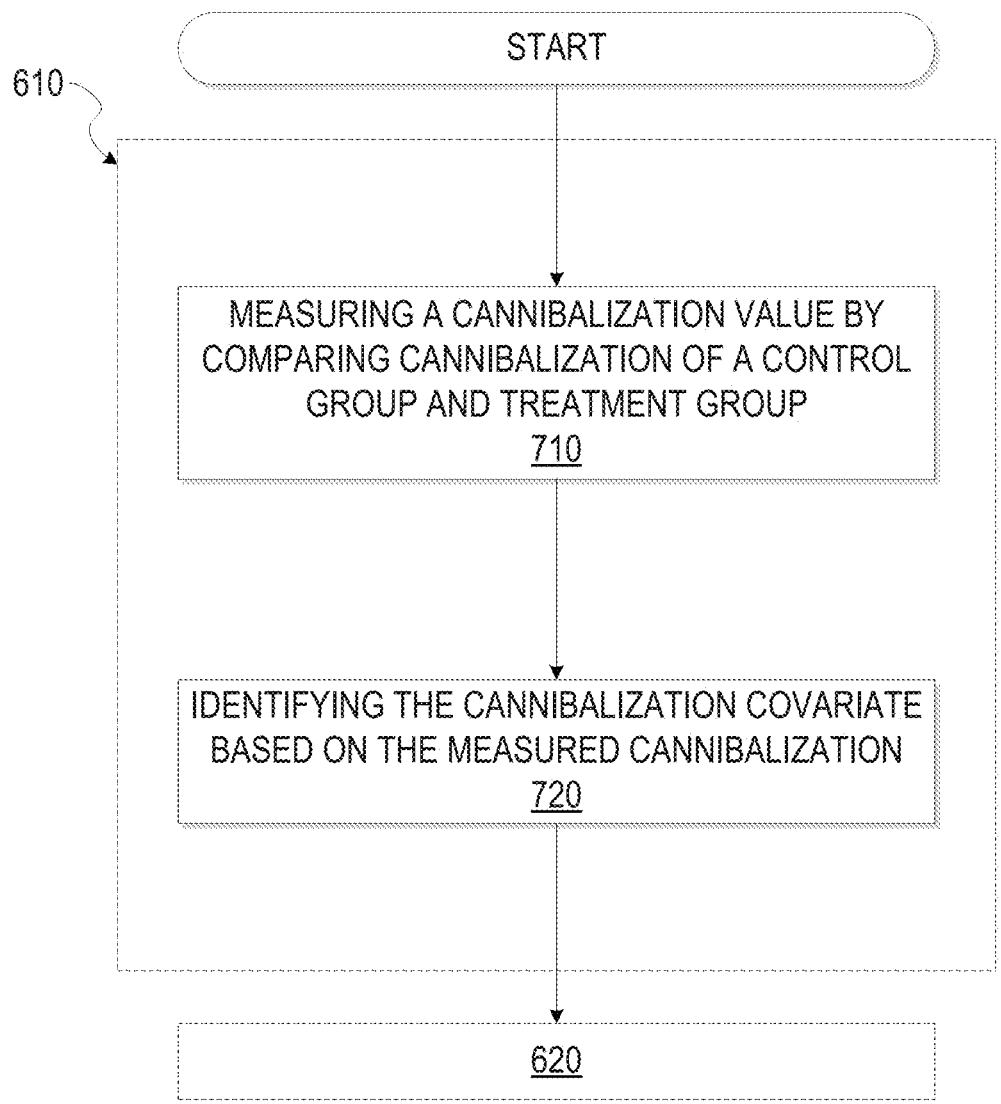
FIG. 7 is a flow diagram illustrating example operations for identifying a cannibalization covariate, according to some example embodiments.

Referring now to FIG. 7, a flow diagram illustrating example operations for identifying the cannibalization covariate is shown. At the operation 610, the analysis module 340 identifies the cannibalization covariate. In some embodiments, the operation 610 includes the additional operations of FIG. 7.

At operation 710, the analysis module 340 measures a cannibalization value by comparing cannibalization of a control group of users shown advertisements (e.g., shown advertisements during a browsing session on an e-commerce website or in an e-commerce app on a mobile computing device) and a treatment group of users not shown advertisements. For example, the cannibalization value can be a comparison in sales revenue, sales count, or another metric between the control group and the treatment group (e.g., a percentage difference in sales). In an example, the difference in sales between the treatment group and the control group is attributed to sales cannibalization resulting from advertisements being show to the control group. In some instances, data from the control group and the treatment group are collected in parallel (e.g., collected the same time or nearly the same time) to minimize effects that can cause a difference in sales revenue other than the advertisement parameters. That is to say, the treatment group of users can have a higher number of sales as compared to the control group of users since the control group of users is shown advertisements (e.g., the advertisements in the control group are causing sales cannibalization). In some embodiments, the analysis module 340 can employ a plurality of control groups and treatment groups to measure a plurality of cannibalization values (e.g., measurements of PPW or GPW) for different groups. Each group of the plurality of control groups and treatment groups can be shown advisements with different advertisement parameters to help identify various effects of the advertisement parameters on sales.

At operation 720, the analysis module 340 identifies the cannibalization covariate from among the candidate covariates (e.g., the advertisement parameters) according to a correlation between respective candidate covariates and the measured cannibalization value. In some embodiments, the cannibalization covariate is a highest correlated candidate covariate among the candidate covariates. For example, clicks, or another advertisement parameter, may be highly correlated with the sales cannibalization caused by advertisements (e.g., when a user clicks on an advertisement there is a high likelihood that sales from that user are lost as a result of the advertisement being presented to the user).

Referring back to FIG. 6, at operation 620, the analysis module 340 generates the covariate model that models the cannibalization covariate with respect to the advertisement parameters. For example, the covariate model can indicate relationships between the cannibalization covariate and advertisement parameters such as placement and impressions.

In a specific example, the analysis module 340 uses a coefficient matrix for regression as follows:

$$\beta=[b_0 b_p b_Q]',$$

The coefficients can be used in the covariate model. In these example equations, placement is denoted by "p" and impressions "Q." In this example, the analysis module 340 models the cannibalization covariate as follows:

$$\text{cannibalization covariate}, f=\bar{X}\beta=b_0+b_p p+b_Q p\odot Q$$

In various embodiments, the analysis module 340 uses the historical data to calculate or estimate $\beta$.

At operation 630, the analysis module 340 generates a cannibalization model that models the cannibalization metric (e.g., PPW or GPW) with respect to the cannibalization covariate. For example, the analysis module 340 generates a regression model with the cannibalization metric as a response variable and the cannibalization covariate as the predictor variable. In various embodiments, the analysis module 340 uses the cannibalization model for variable transformation or conversion. For instance, the analysis module 340 can convert a variable that is specified in terms of the cannibalization metric to a variable specified in terms of the advertisement parameters using the cannibalization model and the covariate model.

In some example embodiments, an operator, manager, or administrator of the cannibalization regulation system 150 specifies the cannibalization to be either PPW or GPW. For example, depending upon the business strategy, as determined by the administrator, the analysis module 340 can employ PPW or GPW as the cannibalization metric.

At operation 640, the analysis module 340 generates a revenue model that models the advertisement revenue with respect to the advertisement parameters. As described above, the advertisement parameters can include an advertisement placement, impressions, clicks, advertiser, an advertisement type, or other parameters. In various embodiments, the revenue model provides an approximation, estimation, or prediction of the advertisement revenue based on the advertisement parameters.

In a specific example, predictor variables can include advertisement parameters such as placement (p) and impressions (Q).

$$X = [p\ Q]$$

In this example, the analysis module 340 uses the regression model matrix that includes placements' main effect and interaction effect with the impressions.

$$\check{X} = [1\ p\ p \odot Q]$$

In this equation, $\odot$ represents element by element multiplication of matrices or vectors. In this example, the analysis module 340 uses the coefficient matrix for modeling advertisement revenue as follows:

$$\alpha = [a_0\ a_p\ a_Q]'$$

These coefficients can be used in the revenue model as shown below. In this example, the analysis module 340 models the advertisement revenue as follows:

$$\text{advertisement revenue, } g = \check{X}\alpha = a_0 + a_p p + a_Q p \odot Q$$

In various embodiments, the analysis module 340 uses the historical data to estimate $\alpha$.

Subsequent to the analysis module 340 identifying the cannibalization covariate, generating the covariate model, generating the cannibalization model, and generating the revenue module, at operation 650, the analysis module 340 determines the value for at least one of the advertisement parameters using the revenue model in conjunction with the cannibalization model and the covariate model.

In various example embodiments, there may not be a global optimization or maximization for the advertisement parameters that optimizes or maximizes advertisement revenue with a bounded cannibalization metric (e.g., a particular advertisement parameter value for one time period may not be optimal for a different time period). In other words, the determined value for a particular advertisement parameter can change with time. To mitigate issues associated with a non-global optimization, the analysis module 340 can determine the value for at least one of the advertisement parameters for a specified time period (e.g., one day or one hour) using the current data in conjunction with the historical data. In these embodiments, the analysis module 340 determines a change amount for at least one of the advertisement parameters for the specified time period by analyzing the historical data in conjunction with the current data. Subsequently, the presentation module 310 causes presentation of the advertisement using the change amount (e.g., adjusts the advertisement parameters by the optimal change amount).

In a specific example, the analysis module 340 determines the change amount relative to the current state (as represented by the current data) to cause the desired change in cannibalization (e.g., maintaining the cannibalization within bounds). In this example, the analysis module 340 can find a gradient of the cannibalization covariate and the advertisement revenue with respect to a change in X. Although X can be discrete, the analysis module 340, in some instances, can consider X to be continuous to find the derivatives in the following equation.

$$\nabla f = \frac{df}{dX} = [b_p + Q' \odot b_Q\ p' \odot b_Q]$$

In this example, for a change in X ($\Delta X$), a change in clicks can be described as follows:

$$\Delta f = \nabla f \Delta X = [b_p + Q' \odot b_Q p \odot b_Q][\Delta_Q{}^{\Delta p}] = b_p \Delta p + Q' \odot b_Q \Delta p + p \odot b_Q \Delta Q = (I) + (II) + (III),$$

In this equation, (I) is a change resulting from removing a placement (e.g., a change in the placement advertising parameter), (II) is a reduction or increase in a number of impressions resulting from removing the placement, (III) is a change resulting from a change in the number of impressions.

In this example, the analysis module 340 determines the advertisement revenue as follows:

$$\Delta g = a_p \Delta p + Q' \odot a_Q \Delta p + p \odot a_Q \Delta Q$$

Subsequent to the analysis module 340 determining the above functions, the analysis module 340 formulates a mixed integer optimization model. For example, at optimization time period t, the analysis module 340 uses $X^{(t-1)}$ to find the change amount in X for time period t or $\Delta X^{(t)}$.

$$\max \Delta g = a_p \Delta p^{(t)} + Q^{(t-1)} \odot a_Q \Delta p^{(t)} + p^{(t-1)} \odot a_Q \Delta Q^{(t)}$$

Such that:

$$c_1 \leq \nabla f \Delta X^{(t)} = b_p \Delta p^{(t)} + Q^{(t-1)} \odot b_Q \Delta p^{(t)} + p^{(t-1)} \odot b_Q \Delta Q^{(t)}$$
$$\leq c_2 \quad \quad (I)$$

$$\Delta Q_i^{(t)}(1 - (p_i^{(t-1)} + \Delta p_i^{(t)})) = 0;\ \forall i \quad \quad (II)$$

$$\Delta p_i^{(t)} \in \{-1, 0, 1\};\ \forall i \quad \quad (III)$$

$$p_i^{(t-1)} + \Delta p_i^{(t)} \in \{0, 1\};\ \forall i \quad \quad (IV)$$

$$Q_i^{(t-1)} + \Delta Q_i^{(t)} \geq 0;\ \forall i \quad \quad (V)$$

$$\Delta Q_i^{(t)} \in I;\ \forall i \quad \quad (VI)$$

In these example equations, constraint (I) is for constraining the change in the cannibalization covariate within desired limits (e.g., the upper limit and the lower limit). Constraint (II) is to set a change in impressions to zero if off placement is kept off or an on placement is turned off (e.g., a particular state of an advertisement placement, such as on or off, is not changed). For constraint (III), $\Delta p_i^{(t)}$ can be set to negative one, zero, or one. For the constraint (III), negative one indicates removing an on placement, zero indicates do nothing, and one indicates to switch on a placement. Constraint (IV) is for not turning off an already off placement or turning on an already on placement. Constraint (V) is to prevent a reduction in a number of impressions greater than the current number of impressions. In some embodiments, constraint (VI) is to constrain results to a set of integers.

In some example embodiments, the constraints described above are revised to allow for a linear optimization as opposed to a non-linear optimization, which can improve computational performance of the analysis module 340. For example, in the constraints above, constraint (II) is non-linear. The analysis module 340 removing the constraint (II) can allow for linear optimization.

In an embodiment, the analysis module 340 can use substitute constraints to replace, for example, constraints (II) and (V) and combine them into a single linear constraint as follows:

$$\max \Delta g = a_p \Delta p^{(t)} + Q^{(t-1)} \odot a_Q \Delta p^{(t)} + p^{(t-1)} \odot a_Q \Delta Q^{(t)}$$

Such that:

$$c_1 \leq \nabla f \Delta X^{(t)} = b_p \Delta p^{(t)} + Q^{(t-1)} \odot b_Q \Delta p^{(t)} + p^{(t-1)} \odot b_Q \Delta Q^{(t)}$$
$$\leq c_2 \quad \quad (I)$$

$$-Q_i^{(t-1)}(p_i^{(t-1)}+\Delta p_i^{(t)}) \leq \Delta Q_i^{(t)} \leq Q_i^{(t-1)}(p_i^{(t-1)}+\Delta p_i^{(t)}); \forall i \quad \text{(II')}$$

$$\Delta p_i^{(t)} \in \{-1,0,1\}; \forall i \quad \text{(III)}$$

$$p_i^{(t-1)}+\Delta p_i^{(t)} \in \{0,1\}; \forall i \quad \text{(IV)}$$

$$\Delta Q_i^{(t)} \in I; \forall i \quad \text{(V)}$$

In these example equations, i is the index for a particular placement. The revised constraint (II') is for setting a change in a number of impressions equal to zero if off placement is kept off or an on placement is turned off. In addition, the change in the number of impressions may not be more than the current number of impressions.

Referring back to FIG. 5, at operation 530, subsequent to the analysis module 340 determining the value for at least one of the advertisement parameters, the presentation module 310 causes presentation, in real time, of the advertisement on the user interface of the client device (e.g., client device 110) using the determined value. In other embodiments, the presentation module 310 causes presentation of the advertisement on the user interface of the client device using the determined change amount for another time period of the duration. The term "real time," as used herein, is intended to include presenting after a short delay. For example, the presentation module 310 communicating instructions to the client device 110 to cause presentation of the advertisement using the determined value may be presented on the client device after a delay interval (e.g., due to transmission delay or other delays such as data being temporarily stored at an intermediate device). This discussion of real time applies equally throughout the specification in relation to other uses of the term "real time."

Once the presentation module 310 causes presentation of the advertisement on the user interface of the client device, in some embodiments, the communication module 320 receives data associated with the advertisement (e.g., did the user click on the advertisement or did the user make a purchase at the website). The data module 330 can store data associated with the advertisement presentation in the database(s) 126 for subsequent analysis. In this way, the cannibalization regulation system 150 can continuously optimize or maximize the advertisement revenue while constraining the cannibalization using the current data and the historical data.

Example User Interfaces

Figure 8:
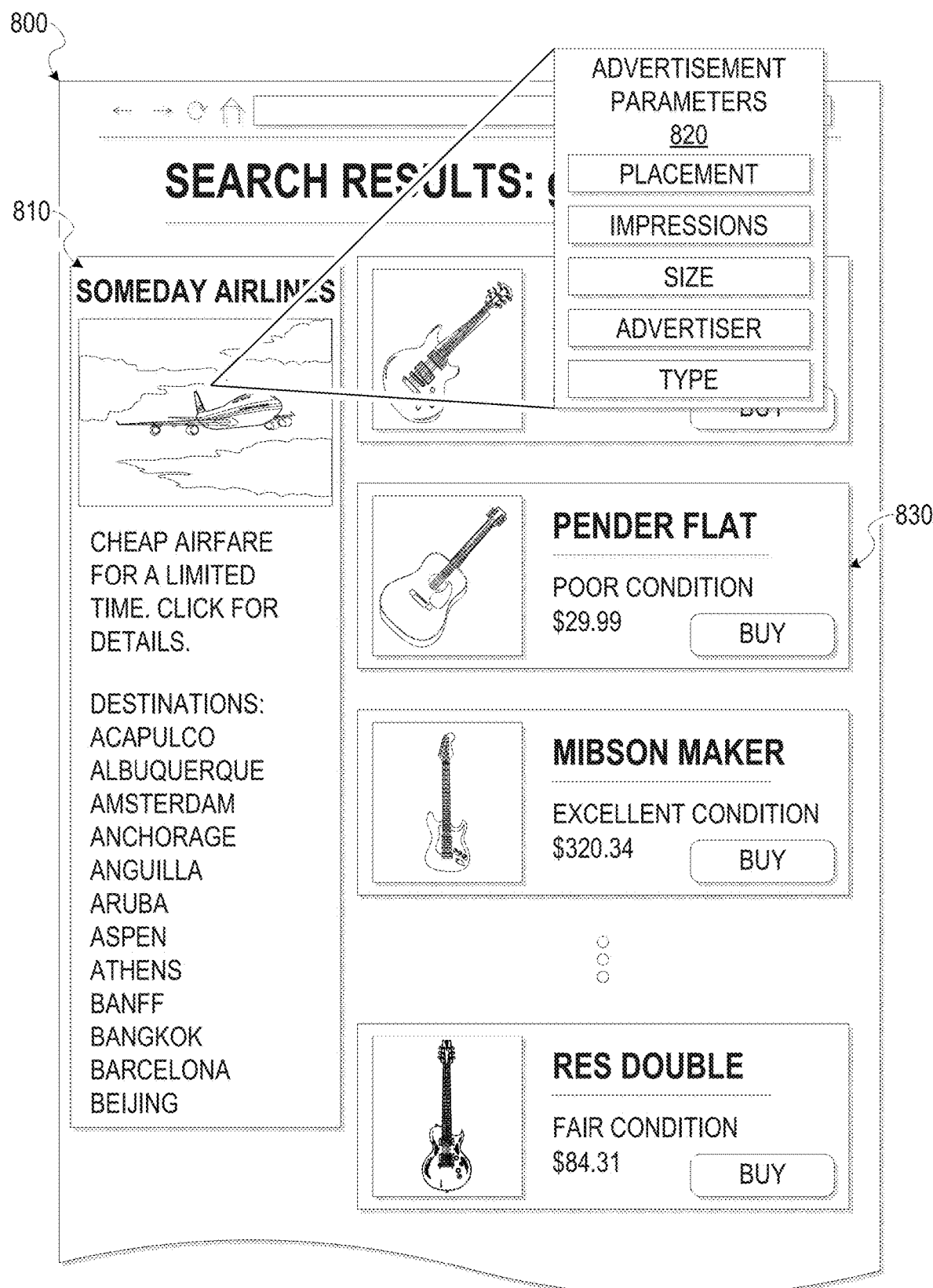
FIGS. 8 and 9 are user interface diagrams depicting various example user interfaces, according to some example embodiments.
Figure 9:
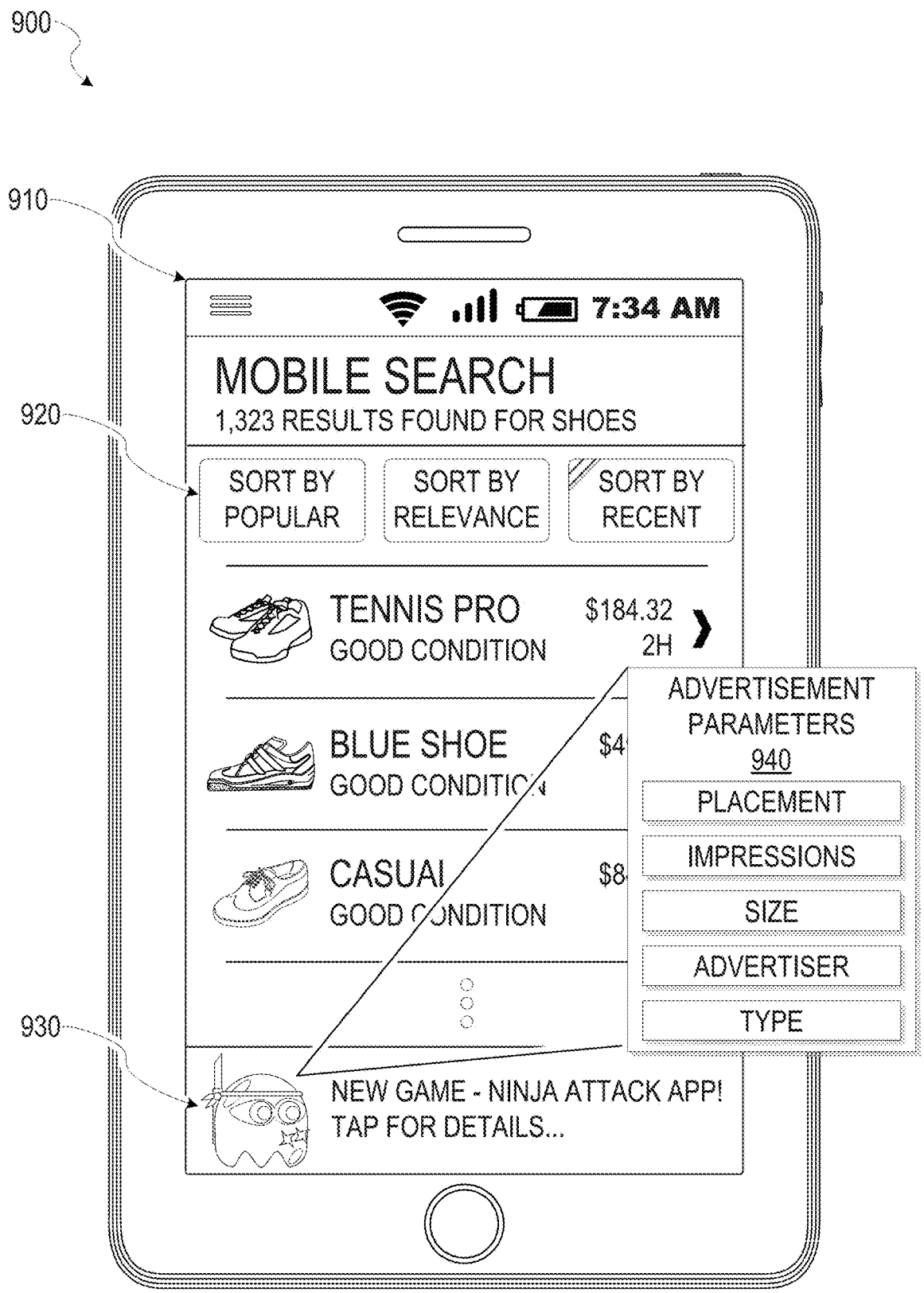

FIGS. 8-9 are user interface diagrams depicting various example user interfaces for interactively presenting information to the user. Although FIGS. 8-9 depict specific example user interfaces and user interface elements, these are merely non-limiting examples; many other alternate user interfaces and user interface elements can be generated by the presentation module 310 and presented to the user. It will be noted that alternate presentations of the displays of FIGS. 8-9 include additional information, graphics, options, and so forth; other presentations include less information, or provide abridged information for easy use by the user.

FIG. 8 is a user interface diagram depicting an example user interface 800. The user interface 800 includes an advertisement 810 corresponding to advertisement parameters 820. The user interface 800 also includes a product for sale 830. The user can interact with the user interface 800 by for example clicking on the advertisement 810 or clicking on the product for sale 830. Such interactions can be observed or otherwise obtained by the cannibalization regulation system 150 for analysis.

In this example, the advertisement parameters 820 include placement, impression, size, advertiser, type, and so on. The presentation module 310 can cause presentation of the advertisement 810 according to various advertisement parameters including the determined value for at least one of the advertisement parameters. For instance, if the analysis module 340 determines the value for the impressions, the presentation module 310 can cause presentation of the advertisement 810 according to the value of the impressions.

FIG. 9 is a user interface diagram 900 that shows an example user interface 910 of a mobile computing device (e.g., a smart phone). The example user interface 910 includes user interface element 920 and an advertisement 930 corresponding to advertisement parameters 940. The user can interact with the various user interface elements of the user interface 910 by tapping on a particular user interface element (e.g., tactile input via a touch screen interface on a mobile device). For instance, the user can sort or otherwise navigate the items for sale included in the user interface 910 using the user interface element 920.

The advertisement parameters include placement, impression, size, advertiser, type, and so on. The presentation module 310 can cause presentation of the advertisement 930 according to various advertisement parameters (e.g., size, position, or placement) including the value for at least one of the advertisement parameters. For instance, if the analysis module 340 determines the value for the impressions, the presentation module 310 can cause presentation of the advertisement 930 according to the value of the impressions.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 10:
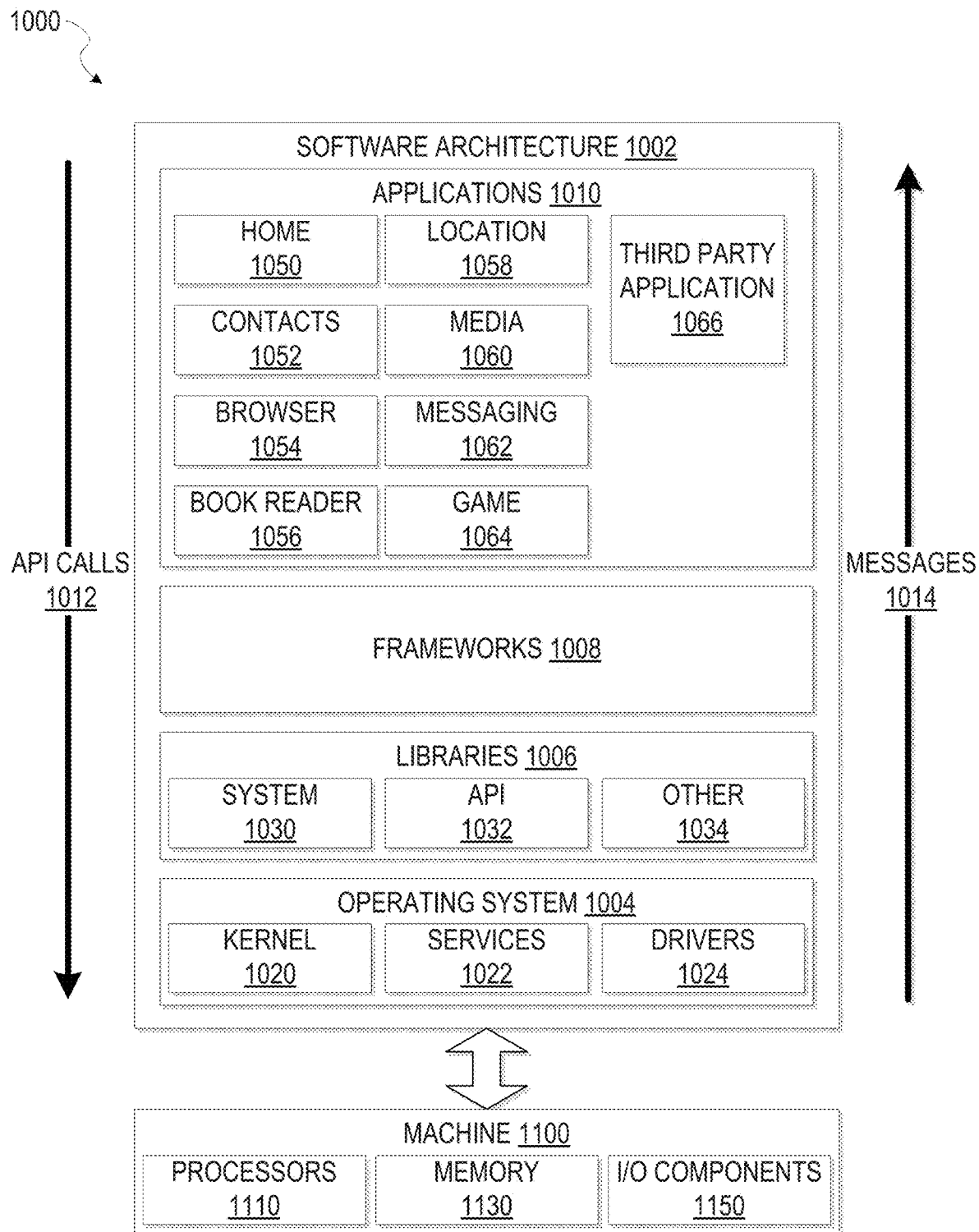
FIG. 10 is a block diagram illustrating an example of a software architecture that may be installed on a machine, according to some example embodiments.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as machine a 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware oresources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1066 can invoke the API calls 1012 provided by the operating system 1004 to facilitate functionality described herein.

Example Machine Architecture and Machine-Readable Medium

Figure 11:
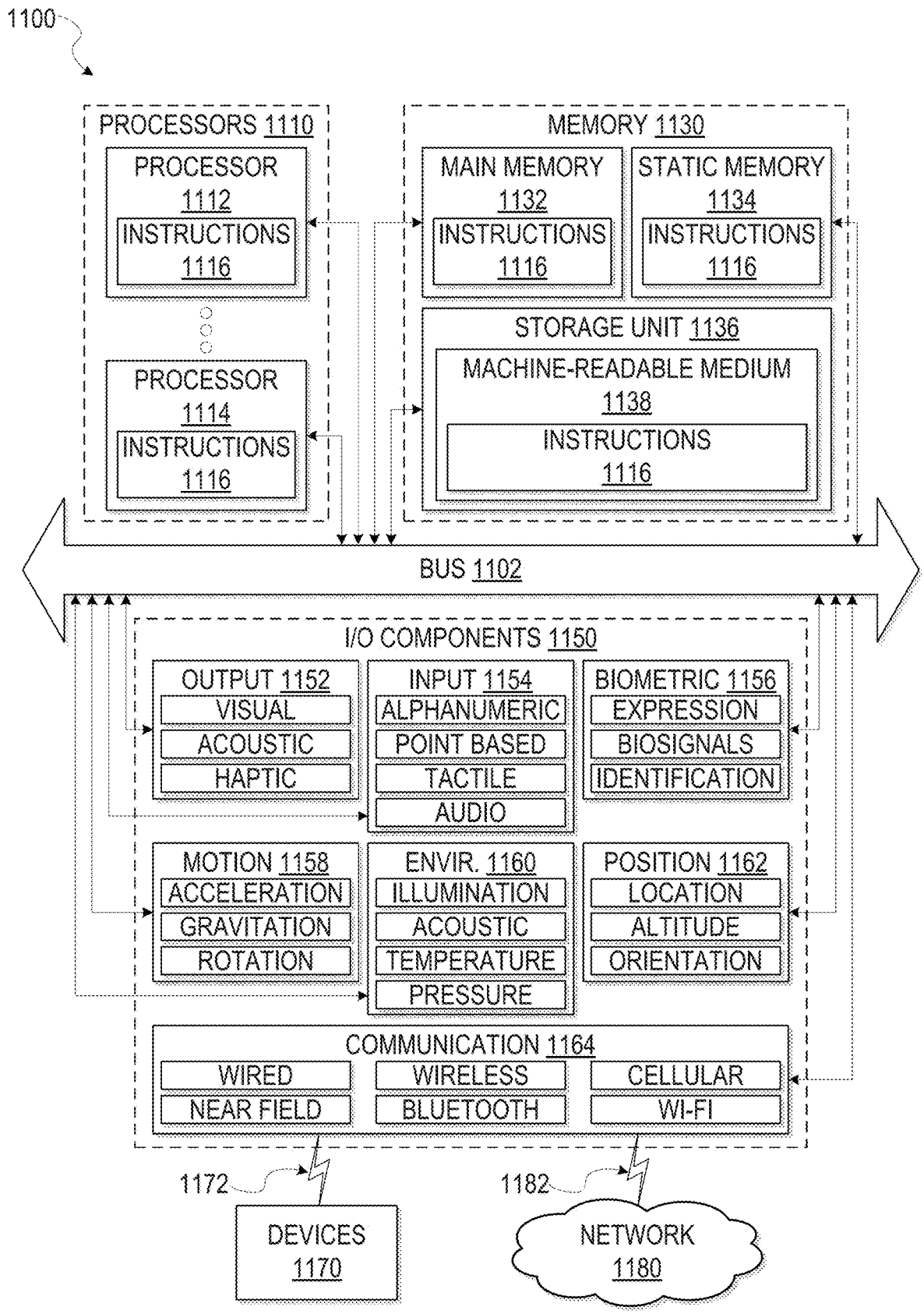
FIG. 11 is a block diagram presenting a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
  one or more processors; and
  one or more machine-readable media communicatively coupled to the one or more processors and having instructions stored thereon that, in response to execution by the one or more processors, cause the system to perform operations, the operations comprising:
    monitoring one or more user navigation metrics, including:
      user selection of displayed links when navigating a website that includes multiple internal pages, wherein one or more of the internal pages include a plurality of links; and
      multiple link parameters of selected links;
    storing historical data that includes the user navigation metrics based on the monitoring;
    obtaining, based on the historical data a cannibalization metric that corresponds to the plurality of links presented on an internal page, the cannibalization metric associated with navigation away from the website;
    determining a relationship between the cannibalization metric and a particular cannibalization covariate that corresponds to the plurality of links, the particular cannibalization covariate predicting navigation away from the website;
    determining a relationship between a first link parameter and the particular cannibalization covariate;
    determining, based on the relationship between the first link parameter and the particular cannibalization covariate, a set of values of the first link parameter that correspond to less than a threshold amount of navigation away from the website;
    selecting a value of the first link parameter that is within the set of values; and
    controlling an amount of user navigation away from the website by causing presentation of a link using the selected value of the first link parameter that is within the set of values.

2. The system of claim 1, wherein the user navigation metrics further include:
  number of times a link to the same location was viewed.

3. The system of claim 1, wherein the historical data further includes:
  one or more historical values of the cannibalization metric; and
  estimated value of displaying one or more links.

4. The system of claim 3, wherein the historical data further includes:
  one or more non-selection navigation activities.

5. The system of claim 1, wherein the multiple link parameters include:
  link size and link position.

6. A method, comprising:
  monitoring, by a computing system, one or more user navigation metrics, including:
    user selection of displayed links when navigating a website that includes multiple internal pages, wherein one or more of the internal pages include a plurality of links; and multiple link parameters of selected links;

storing, by the computing system, historical data that includes the user navigation metrics based on the monitoring;

obtaining, by the computing system based on the historical data, including the user selection of displayed links, a cannibalization metric that corresponds to the plurality of links presented on an internal page, the cannibalization metric associated with navigation away from the website;

determining, by the computing system, a relationship between the cannibalization metric and a particular cannibalization covariate that corresponds to the plurality of links, the particular cannibalization covariate predicting navigation away from the website;

determining, by the computing system, a relationship between a first link parameter and the particular cannibalization covariate;

determining, by the computing system based on the relationship between the first link parameter and the particular cannibalization covariate, a set of values of the first link parameter that correspond to less than a threshold amount of navigation away from the website;

selecting, by the computing system, a value of the first link parameter that is within the set of values; and controlling, by the computing system, an amount of user navigation away from the website by causing presentation of a link using the selected value of the first link parameter that is within the set of values.

7. The method of claim 6, wherein the historical data further includes:

number of times a link to the same location was viewed.

8. The method of claim 6, wherein the historical data further includes:

one or more historical values of the cannibalization metric; and estimated value of displaying one or more links.

9. The method of claim 8, wherein the historical data further includes:

one or more non-selection navigation activities.

10. The method of claim 6, wherein the multiple link parameters include:

link size and link position.

11. The method of claim 10, wherein the multiple link parameters further include:

number of times a link to the same location is displayed on a page; and entity maintaining external page targeted by a link.

12. The method of claim 6, wherein the determining the set of values of the first link parameter is based on an estimated value of displaying one or more links.

13. The method of claim 6, wherein the determining the set of values of the first link parameter is based on a prediction that the set of values of the first link parameter maintains the cannibalization metric within a bounded range.

14. A non-transitory computer-readable medium having instructions stored thereon that are executable by a computing device to perform operations comprising:

monitoring one or more user navigation metrics, including:

user selection of displayed links when navigating a website that includes multiple internal pages, wherein one or more of the internal pages include a plurality of links; and multiple link parameters of selected links;

storing historical data that includes the user navigation metrics based on the monitoring;

obtaining, based on the historical data, including the user selection of displayed links, a cannibalization metric that corresponds to the plurality of links presented on an internal page, the cannibalization metric associated with navigation away from the website;

determining a relationship between the cannibalization metric and a particular cannibalization covariate that corresponds to the plurality of links, the particular cannibalization covariate predicting navigation away from the website;

determining a relationship between a first link parameter and the particular cannibalization covariate;

determining, based on the relationship between the first link parameter and the particular cannibalization covariate, a set of values of the first link parameter that correspond to less than a threshold amount of navigation away from the website;

selecting a value of the first link parameter that is within the set of values; and controlling an amount of user navigation away from the website by causing presentation of a link using the selected value of the first link parameter that is within the set of values.

15. The non-transitory computer-readable medium of claim 14, wherein the historical data further includes:

number of times a link to the same location was viewed.

16. The non-transitory computer-readable medium of claim 14, wherein the historical data further includes:

one or more historical values of the cannibalization metric.

17. The non-transitory computer-readable medium of claim 16, wherein the historical data further includes:

estimated value of displaying one or more links; and one or more non-selection navigation activities.

18. The non-transitory computer-readable medium of claim 14, wherein the multiple link parameters include:

link size and link position; and number of times a link to the same location is displayed on a page.

19. The non-transitory computer-readable medium of claim 18, wherein the multiple link parameters include:

entity maintaining external page targeted by the link.

* * * * *